னை3,071,628
REFINING FLUORINATED COMPOUNDS
Adrian L. Linch, Wilmington, Del., assignor to the United
States of America as represented by the United States
Atomic Energy Commission
No Drawing. Filed Mar. 7, 1946, Ser. No. 652,827
3 Claims. (Cl. 260—653)

This invention relates to the purification of perfluorinated organic compounds. It is particularly concerned with the removal of impurities from perfluorinated hydrocarbons containing impurities which adversely affect their stability.

Hydrocarbon derivatives in which essentially all of the hydrogen of the hydrocarbon has been replaced by fluorine may be produced by the reaction of cobalt trifluoride, silver difluoride, or manganese trifluoride upon hydrocarbons. The resulting perfluorinated products may be contaminated with incompletely fluorinated intermediates or by-products. Since an important characteristic of the perfluorinated organic compounds is their stability to oxidizing agents, it is desirable to provide a method for removing any constituents which might be detrimental to their stability. The unstable hydrogen-containing by-products can be removed from the fluorinated compounds by treatment with an active oxidizing agent, such as uranium hexafluoride, which converts the impurities to perfluorinated compounds and is converted to uranium tetrafluoride which may be separated by filtration. A disadvantage of this purification method is the relative cost of the uranium hexafluoride employed as a reagent.

An object of the present invention is to provide a purification method for removing undesirable impurities from perfluorinated compounds. A further object of the invention is to provide a purification process whereby perfluorinated compounds essentially free of unstable materials reactive with oxidizing agents such as uranium hexafluoride may be obtained. A further object is to remove, from perfluorinated hydrocarbon oils, unstable congenital impurities boiling from the crude mixtures in the same temperature range as the perfluorinated compounds. Further objects of the invention will appear from the following description thereof and detailed examples.

In accordance with the present invention a perfluorinated organic compound containing impurities detrimental to its stability is washed with a chlorinated hydrocarbon which, when mixed with the perfluorinated compound, maintains a separate liquid phase. It has been found that a washing treatment employing a solvent of this type effectively removes unstable impurities from perfluorinated organic compounds containing them in solution or suspension.

Examples of solvents suitable for the purposes of the invention are carbon tetrachloride, trichlorethene, perchlorethene, and chloroform. These solvents are particularly advantageous for use in the purification of high-boiling perfluorinated organic compounds because they are readily and completely separable by a fractional distillation or topping treatment. Thus no remnants of the solvent need be retained in the perfluorinated compound being purified.

The process of the invention is applicable to the purification of perfluorinated organic compounds in general. It is particularly valuable for the purification of high-boiling fluorinated oils, such as fluorolubricants distilling between 150° C. and 300° C. at 10 millimeters of mercury absolute pressure, and higher-boiling perfluorinated compounds.

A naphthenic oil of petroleum origin having a distillation range of about 180° to 250° C. at 10 millimeters of mercury absolute pressure may be fluorinated in vapor phase by means of cobalt trifluoride and from the fluorination product a valuable fluorolubricant having a distillation range of about 160° C. at 10 millimeters of mercury to 185° C. at 0.4 millimeter of mercury may be obtained. Such a product may contain sufficient unstable impurities to form 2% or more of its weight of uranium tetrafluoride residue when reacted with uranium hexafluoride. The proportion of residual organic hydrogen may amount to 0.4% or more. By washing such a product with carbon tetrachloride at ordinary temperature, the proportion of residue formed on treatment with uranium hexafluoride may be reduced readily to 0.1 to 0.3% or less of the product and the hydrogen content may be reduced to 0.1% or less.

The washing treatment may be carried out either at ordinary room temperatures or at elevated temperatures. Elevated temperatures have the advantage of reducing the viscosity of the perfluorinated organic compound but are not necessary for effective purification of the perfluorinated compound. In some cases they increase the mutual solubilities of the liquids to an undesirable degree.

The process may be carried out by continuous extraction procedures or by batch methods. In either case conventional extraction apparatus may be employed.

The solvent may be separated from higher-boiling impurities by distillation and may be reused for the extraction of further quantities of perfluorinated compound or for a later extraction of the same product.

The following examples further illustrate the invention. In these examples quantities are in terms of weight unless otherwise indicated.

*Example 1*

A perfluorolubricant obtained by fluorinating a petroleum lubricant oil as described above had an average composition corresponding to the formula $C_{21}F_{29}$ and contained fluorocarbons of from 12 to 26 carbon atoms per molecule. Upon treatment of a sample with uranium hexafluoride, a uranium tetrafluoride residue corresponding to 3.85% by weight of the product was obtained. One hundred parts of the untreated crude product was mixed with 160 parts of carbon tetrachloride and the mixture was heated under reflux at about 80° C. for about one hour. It was then permitted to cool in air to below 40° C. and the carbon tetrachloride layer was decanted off. One hundred sixty parts of fresh carbon tetrachloride was added to the residual fluorolubricant and the mixture was again heated under reflux for about one hour and then cooled as in the first step. The second portion of carbon tetrachloride was then decanted off from the fluorolubricant and the latter was heated below its distillation temperature for a short time to evaporate dissolved carbon tetrachloride. During the extraction the color of the fluorolubricant changed from dark brown to practically colorless.

Upon treatment with uranium hexafluoride, the product yielded a uranium tetrafluoride residue corresponding to only 0.1% thereof. The hydrogen content of the product was found to be 0.04%.

*Example 2*

A fluorolubricant of the type employed in Example 1 but containing only sufficient impurities to provide a uranium tetrafluoride residue of 0.16% was extracted twice employing eight-tenths its weight of carbon tetrachloride in each extraction. The carbon tetrachloride, fluorolubricant mixture was heated approximately to boiling (about 80° C.) in each of the two extraction steps. It was observed that the mixture formed a single phase which separated again into two phases on cooling. The carbon tetrachloride was separated as in Example 1.

The proportion of uranium tetrafluoride residue formed upon testing the purified fluorolubricant was 0.03%.

*Example 3*

One thousand forty-seven parts of a crude fluorolubricant mixture, composed of about two-thirds fluorolubricant and one-third lower-boiling perfluorinated oils was used. A separate phase of hydrogen-containing impurities was present indicating so high an instability as to render the usual test method dangerous. This crude was stirred at reflux temperature with 1008 parts of carbon tetrachloride for about an hour. The mixture was then cooled and the carbon tetrachloride phase was separated by decantation. The extracted oil was extracted again with about 960 parts of carbon tetrachloride in the same manner. After separation of the second batch of carbon tetrachloride the fluorolubricant was heated to remove dissolved extractant.

The product of the extraction, upon treatment with uranium hexafluoride, yielded only 0.16% residue.

*Example 4*

Eleven hundred parts of the same crude as employed in Example 3 was extracted with 1040 parts of carbon tetrachloride and the extracted product was re-extracted with 960 parts of fresh carbon tetrachloride, both extractions being carried out at room temperature (about 25–30° C.). After evaporation of residual carbon tetrachloride, the product gave 0.15% residue upon treatment with uranium hexafluoride.

*Example 5*

About 5 parts of the crude mixture described in Example 3 was placed in an unpacked extraction column and a total of about 80 parts of carbon tetrachloride was passed up through the column in 2½ hours at about 30° C. During this period carbon tetrachloride withdrawn from the top of the column was distilled to separate high-boiling extract, was condensed and then returned to the bottom of the column. The perfluorinated product was withdrawn from the column, heated to expel dissolved carbon tetrachloride and tested with uranium hexafluoride. A residue value of 0.10% was obtained.

It will be understood that I intend to include variations and modifications of the invention and that the preceding examples are illustrations only and in no wise to be construed as limitations upon the invention, the scope of which is defined in the appended claims, wherein I claim:

1. The method of refining a liquid perfluorinated hydrocarbon oil distilling between 150° C. and 300° C. at 10 mm. Hg absolute pressure and containing fluorocarbons having from 12 to 26 carbon atoms per molecule which comprises washing said perfluorinated oil with a chlorinated lower aliphatic hydrocarbon which maintains a separate liquid phase when mixed with said perfluorinated oil whereby impurities detrimental to the stability of said oil are extracted by said chlorinated lower aliphatic hydrocarbon.

2. The method of refining a liquid perfluorinated hydrocarbon oil distilling between 150° C. and 300° C. at 10 mm. Hg absolute pressure and containing fluorocarbons having from 12 to 26 carbon atoms per molecule and also impurities detrimental to its stability which comprises washing said perfluorinated oil with a low boiling chlorinated hydrocarbon which contains from 1 to 2 carbon atoms and from 3 to 4 chlorine atoms per molecule and which is not completely miscible with said perfluorinated oil at atmospheric temperature, and separating said perfluorinated oil by distillation from any chlorinated hydrocarbon that has dissolved therein.

3. The method of refining a liquid perfluorinated hydrocarbon oil distilling between 150° C. and 300° C. at 10 mm. Hg absolute pressure and containing fluorocarbons having from 12 to 26 carbon atoms per molecule to remove unstable congenital impurities boiling from mixtures thereof with said perfluorinated oil in the same temperature range as said perfluorinated oil which comprises washing said perfluorinated hydrocarbon oil with carbon tetrachloride.

References Cited in the file of this patent

UNITED STATES PATENTS

| | | |
|---|---|---|
| 1,946,195 | Daudt | Feb. 6, 1934 |
| 1,946,199 | Dunphy | Feb. 6, 1934 |
| 2,005,710 | Daudt et al. | June 18, 1935 |
| 2,058,453 | Holt et al. | Oct. 27, 1936 |
| 2,473,911 | Sarsfield | June 21, 1949 |